(12) United States Patent
Okamoto (10) Patent No.: US 7,911,692 B2
(45) Date of Patent: Mar. 22, 2011

(54) SCREEN AND PROJECTION SYSTEM (75) Inventor: Junichi Okamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/822,478

(22) Filed: Jun. 24, 2010

(65) Prior Publication Data
US 2011/0002035 A1 Jan. 6, 2011

(30) Foreign Application Priority Data

Jul. 3, 2009 (JP) ................................. 2009-158695
May 11, 2010 (JP) ................................. 2010-109272

(51) Int. Cl.
*G03B 21/56* (2006.01)
*G03B 21/60* (2006.01)
*G02B 5/28* (2006.01)

(52) U.S. Cl. .................... 359/449; 359/452; 359/589

(58) Field of Classification Search .......... 359/452–453, 359/589, 449
See application file for complete search history.

(56) References Cited

U.S. PATENT DOCUMENTS

| 6,639,631 | B1* | 10/2003 | Hall et al. | 359/455 |
| 7,078,697 | B2* | 7/2006 | Barker et al. | 250/343 |
| 7,573,549 | B2* | 8/2009 | Nishihara et al. | 349/112 |
| 2007/0002438 | A1* | 1/2007 | Toda et al. | 359/452 |

FOREIGN PATENT DOCUMENTS

| JP | A-2002-107828 | 4/2002 |
| JP | A-2006-317832 | 11/2006 |

* cited by examiner

*Primary Examiner* — Christopher Mahoney
(74) *Attorney, Agent, or Firm* — Oliff & Berridge, PLC (57) ABSTRACT

A screen includes: a substrate; and a first color material layer disposed on one surface of the substrate, wherein the first color material layer includes a first color material adapted to absorb light with a part of wavelengths of an incident light, and the first color material has a peak absorption wavelength in a visible light range, and a size of causing Mie scattering on the light in the visible light range.

10 Claims, 5 Drawing Sheets

SCREEN AND PROJECTION SYSTEM

BACKGROUND

1. Technical Field

The present invention relates to a screen and a projection system.

2. Related Art

In the past, there have been used various types of screens as projection surfaces for enlarged images used for image viewing with projectors (projecting display devices) in, for example, presentations in exhibitions, academic conferences, meetings, and so on, and home theaters.

In related art screens there exists a problem that the contrast as a luminance ratio between "white (the maximum luminance)" and "black (the minimum luminance)" is low in bright places, and it is difficult to display clear images because, in the case of reflective screens, for example, the screens reflect the light projected from projectors to thereby display the projection images, and at the same time, also reflect outside light derived from use environments such as illumination light or sunlight. Therefore, development of a screen aimed to realize an improved contrast in bright rooms by suppressing the influence of the outside light causing the degradation in the contrast such as sunlight or illumination light to thereby lower the minimum luminance is in progress.

As such a screen there is proposed one having a configuration in which a light absorption layer including dye or a pigment absorbing light is provided to thereby absorb unwanted outside light (see, e.g., JP-A-2002-107828).

In the configuration described in the document mentioned above, there is formed a layer structure composed of a scattering layer and a light absorbing layer stacked in this order from the light entrance side. However, in such a configuration, since the wavelength component of the light on which the outer light absorption process is not performed is reflected toward the viewing side (the side of the observer) due to the backscattering on the surface of the scattering layer, the effectiveness of improvement in contrast by the light absorbing layer is not sufficient, and the chromatic purity is degraded. Further, the scattering material included in the scattering layer is often high in cost, and moreover, the process required for providing the scattering layer increases the number of processes, which also causes increase in cost of manufacturing a screen.

SUMMARY

An advantage of some aspects of the invention is to provide a screen for obtaining high-contrast images at low cost. Another advantage of some aspects of the invention is to provide a projection system having such a screen.

According to a first aspect of the invention, there is provided a screen including a substrate, and a first color material layer disposed on one surface of the substrate, wherein the first color material layer includes a first color material adapted to absorb light with a part of wavelengths of an incident light, and the first color material has a peak absorption wavelength in a visible light range, and a size of causing Mie scattering on the light in the visible light range.

According to the configuration of this aspect of the invention, it is possible to absorb the light with the wavelength overlapping the peak absorption wavelength of the first color material out of the outside light spectrum, thereby reducing the outside light component in the visible light range. Further, since the first color material is used as a scattering source, there is no need for separately providing a scattering layer having a function of providing a scattering property to the incident light to thereby broaden the view angle. Therefore, the manufacturing process can be reduced compared to the case of separately forming the scattering layer.

Here, in the aspects of the invention, the "color material" denotes a material of absorbing a part of the incident visible light to thereby provide the color material layer with a color. For example, it is for absorbing a part of the incident white light to thereby modulate the incident light into the light of a color corresponding to the complementary color of the light with the absorption wavelength.

Further, since in the Mie scattering caused in the first color material the forward scattered light is generated with priority, the light applied to the first color material is scattered forward (in the incident direction of the incident light) more intensively. Therefore, when applied to, for example, the reflective screen, the probability that the outside light having failed to be absorbed by the first color material is scattered backward (the viewing side) to reach the observer is reduced. According to these reasons, the screen having the preferably improved contrast of the projection images can be provided at low price.

In the screen according to the first aspect of the invention, it is preferable that a binder resin of the first color material layer has a refractive index different from a refractive index of the first color material.

According to the configuration described above, it is possible to preferably cause the Mie scattering on the light in the visible light range between the first color material and the binder resin in accordance with the difference in refractive index between the first color material and the binder resin. Therefore, it becomes easy to provide a desired scattering property to the first color layer, and the screen having the preferably improved contrast of the projection images can be provided.

In this aspect of the invention, it is preferable that there is provided a reflecting layer disposed between the substrate and the first color material layer, and adapted to reflect the incident light.

According to the configuration described above, it is possible to reflect the projection light having passed through the first color material layer to return it to the viewing side. Therefore, it is possible to obtain the reflective screen achieving the preferable contrast improvement.

In the screen according to the first aspect of the invention, it is preferable that there is provided a second color material layer including a second color material, disposed on a side opposite to a viewing side with respect to the first color material layer, and adapted to absorb light with a part of wavelengths of the incident light, and the second color material has a peak absorption wavelength in the visible light range, and a size of causing Rayleigh scattering on the light having a wavelength in the visible light range.

According to the configuration of this aspect of the invention, it is possible to absorb the light with the wavelength overlapping the peak absorption wavelength of the second color material out of the outside light spectrum, thereby reducing the outside light component in the visible light range. Further, since in the Rayleigh scattering caused in the second color material the scattering is performed isotropically, and the forward scattered light and the backscattered light are generated, the light applied to the second color material is scattered forward and backward in substantially the same level. Therefore, the projection light having reached the second color material layer is scattered toward the viewing side and reaches the observer. Therefore, the screen having the preferably improved contrast of the projection images can be provided.

In the screen according to the first aspect of the invention, it is preferable that a binder resin of the second color material layer has a refractive index different from a refractive index of the second color material.

According to the configuration described above, it is possible to preferably cause the Rayleigh scattering on the light in the visible light range between the second color material and the binder resin in accordance with the difference in refractive index between the second color material and the binder resin. Therefore, it becomes easy to provide a desired scattering property to the second color layer, and the screen having the preferably improved contrast of the projection images can be provided.

In the screen according to the first aspect of the invention, it is preferable that the second color material includes a plurality of metal fine particles adapted to cause a surface plasmon resonance.

According to the configuration described above, such metal fine particles as to cause the surface plasmon resonance can absorb the light corresponding to the resonance to thereby provide color to the second color material layer, and therefore, can be made to absorb the intended outside light. Further, if the metallic fine particles are used as the second color material, deterioration in the light resistance is not caused even by the long-term use, and it becomes possible to maintain the intended quality for a long period of time.

Further, according to a second aspect of the invention, there is provided a screen including a substrate, a first color material layer disposed on one surface of the substrate, and a second color material layer disposed between the substrate and the first color material layer, wherein the first color material layer and the second color material layer include a color material adapted to absorb light with a part of wavelengths of the incident light, the color material has a peak absorption wavelength in a visible light range, and a size of causing Mie scattering on the light having a wavelength in the visible light range, and a density of the color material in the second color material layer is higher than a density of the color material in the first color material layer.

According to the configuration of this aspect of the invention, it is possible to absorb the light with the wavelength overlapping the peak absorption wavelength of the color material out of the outside light spectrum, thereby reducing the outside light component in the visible light range. Further, by varying the densities of the color material in the first color material layer and the second color material layer, it becomes possible to make the scattering states different from each other while using the same color material, thereby controlling the function of providing the scattering property to the incident light to broaden the view angle, and the function of returning the incident light toward the opposite direction to the incident direction. Therefore, the screen having the preferably improved contrast of the projection images can be provided using a smaller amount of material.

Further, in the screen according to the second aspect of the invention, it is preferable that a binder resin of the first color material layer and a binder resin of the second color material layer each have a refractive index different from a refractive index of the color material.

According to the configuration described above, it is possible to preferably cause the Mie scattering on the light in the visible light range between the color material and the binder resin, and it becomes easy to make the scattering state different between the first color material layer and the second color material layer due to the difference in the density of the color material while using the same color material. Therefore, the screen having the preferably improved contrast of the projection images can be provided.

In this aspect of the invention, it is preferable that there is provided a reflecting layer disposed between the substrate and the second color material layer, and adapted to reflect the incident light.

According to the configuration described above, it is possible to reflect the projection light having passed through the second color material layer to return it to the viewing side. Therefore, it is possible to obtain the reflective screen achieving the preferable contrast improvement.

Further, according to another aspect of the invention, there is provided a projection system including the screen according to the above aspects of the invention, and a projector adapted to project an image on the screen.

According to the configuration described above, since uniform and bright projection images can be obtained even if a projector with low power is used, it is possible to realize a projection system having low power consumption while keeping the quality of the images.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a screen according to a first embodiment of the invention will be explained with reference to FIGS. 1 through 3, 4A, and 4B. It should be noted that in all of the drawings described below, the ratios between the sizes of the constituents or the like are made appropriately different from each other in order for making the drawings eye-friendly.

Figure 1:
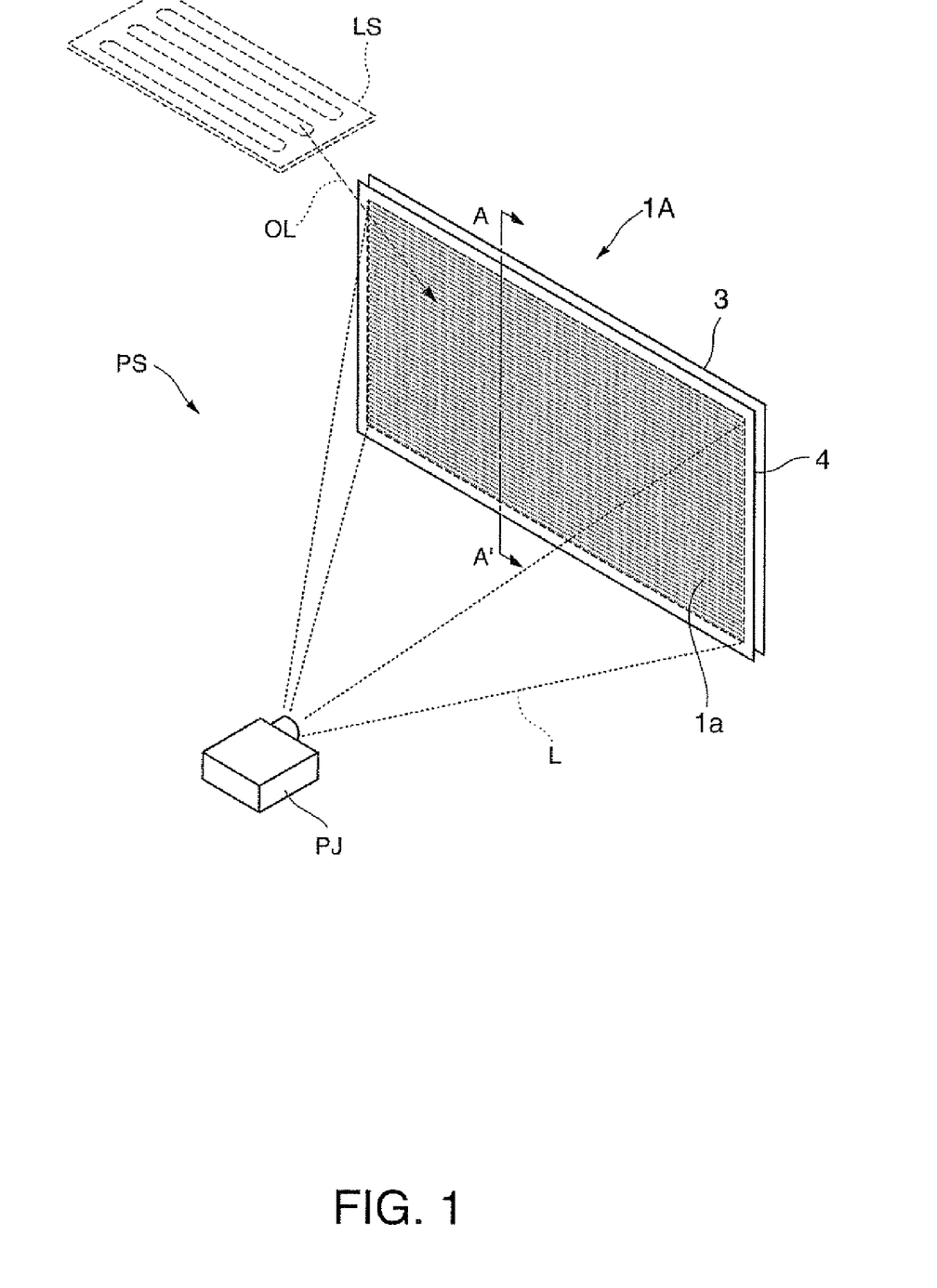
FIG. 1 is a perspective view showing a screen and a projection system according to embodiments of the invention.

FIG. 1 is a perspective view showing a schematic configuration of the screen 1A according to the present embodiment and a projection system PS according to the present embodiment.

As shown in the drawings, the screen 1A according to the present embodiment is a reflective screen, and has a projection target surface 1a provided with a first absorbing/scattering layer (a first color material layer) 4 including a color material selectively absorbing the outside light OL, and a reflecting layer 3 disposed on the reverse side (opposite side to the viewing side) of the first absorbing/scattering layer 4.

Further, the screen 1A has a rectangular landscape planar shape for reflecting the projection light L frontward, which is projected from a close-up projection type projector (projecting display device) PJ disposed obliquely below and anterior to the front side of the screen. The projection system PS has a configuration obtained by adding the projector PJ to the screen 1A.

The screen 1A according to the embodiment of the invention preferably reflects the projection light L, which is projected to the projection target surface 1a, toward the front of the screen 1A, and at the same time absorbs the outside light OL with the first absorbing/scattering layer 4, thereby forming a screen capable of displaying high-contrast images. Hereinafter, a detailed explanation will be presented.

Figure 2:
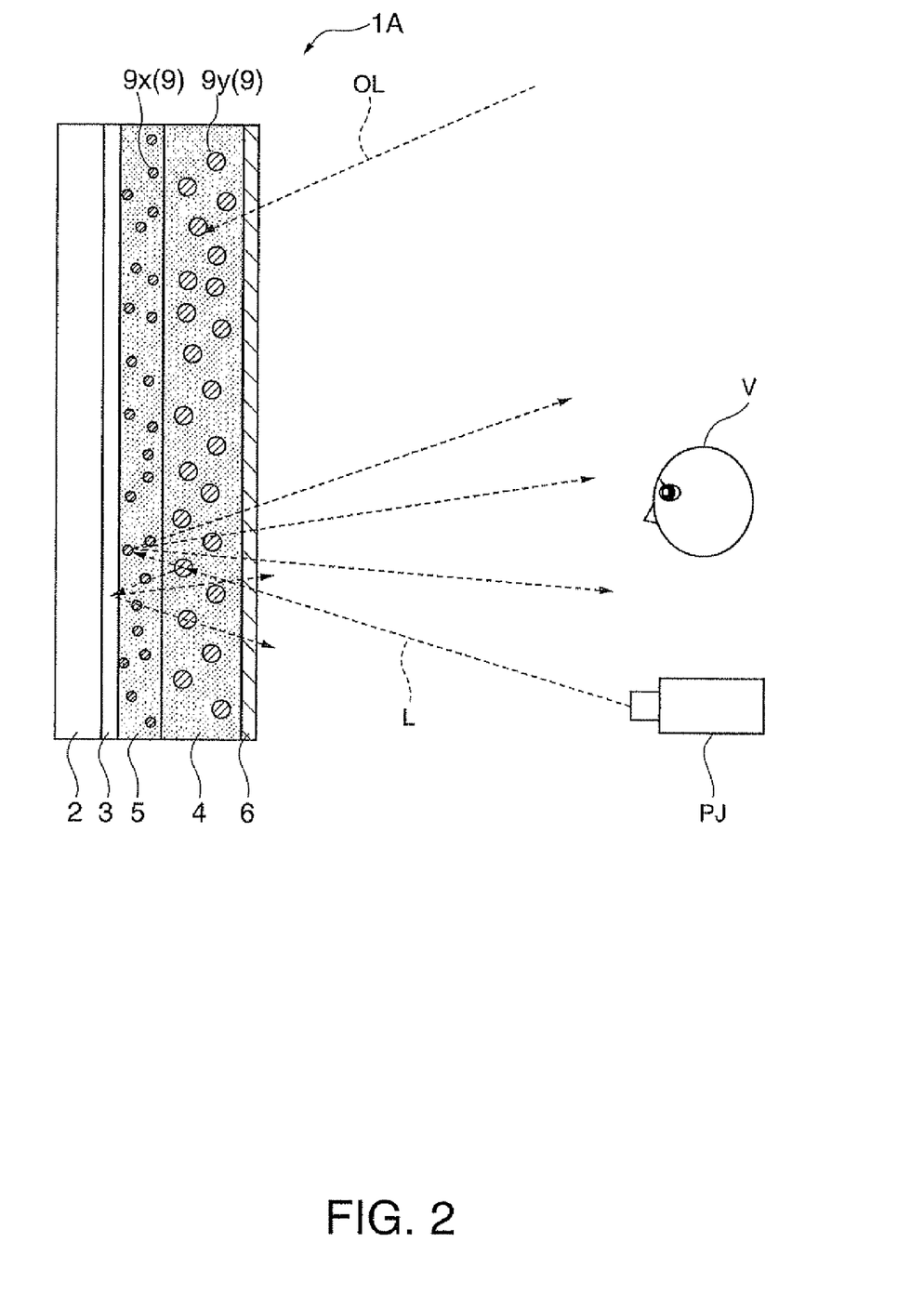
FIG. 2 is an explanatory diagram of a screen according to a first embodiment of the invention.

FIG. 2 is an explanatory diagram of the screen 1A, and shows a cross-sectional view along the line segment A-A' shown in FIG. 1.

As shown in the drawing, the screen 1A has a reflecting layer 3 disposed on a substrate 2, a second absorbing/scattering layer (a second color material layer) 5 disposed on the reflecting layer 3, the first absorbing/scattering layer 4 disposed on a viewing side of the second absorbing/scattering layer 5 so as to cover the second absorbing/scattering layer 5, and an antireflection layer 6 disposed on the front face so as to cover the first absorbing/scattering layer 4. It is also possible to arrange that an adhesive layer (not shown) is provided between the layers.

The substrate 2 is formed using a black light-absorbing material composed of light absorbing filler and binder resin. The filler is for absorbing natural light or white light and is made of a pigment such as carbon black, black pigment particles, or the like. As the binder resin thermoplastic resin is used, and preferably, thermoplastic elastomer having elasticity is used. Specifically, polyurethane resin, polyolefin resin, polyvinyl chloride resin, and so on are preferably used. Further, it is also possible to add a curing agent, an antistatic agent, an antifouling agent, an ultraviolet absorbing agent for preventing deterioration of the binder resin, and so on to the substrate 2 as additive agents added to the filler and the binder resin.

It should be noted that the substrate 2 can also be disposed on a support member not shown. The support member is formed of a flexible member such as a film, and is made of polyethylene terephthalate (PET), polyethylene naphthalate (PEN), polycarbonate (PC), or the like. Further, it is also possible to arrange that an aluminum composite plate, for example, is bonded to the reverse side (the opposite side to the substrate 2) of the support member, thereby increasing the strength of the screen 1A.

The reflecting layer 3 can be formed using a material having light reflectivity used in common screens. As such a material a metallic material such as aluminum or silver can be cited, and the reflecting layer 3 can be formed using a gas phase method such as an evaporation method or a liquid phase method such as a spray method using ink composed of binder resin having metallic fine particles dispersed.

The first absorbing/scattering layer 4 and the second absorbing/scattering layer 5 each include a color material 9 having a peak absorption wavelength in the visible light region. In the screen 1A according to the present embodiment, at least two sizes of color materials 9y (a first color material), 9x (a second color material) are used. The color material 9x has a size for causing Rayleigh scattering on the light having a wavelength in the visible light region, and the color material 9y has a size for causing Mie scattering on the light having a wavelength in the visible light region.

The color materials 9x, 9y are preferably provided with the absorption wavelength band showing absorption peak (the peak absorption wavelength) at a position not overlapping the bright line spectrum of the light source of the projector PJ. In other words, the color materials 9x, 9y preferably have a spectrum absorbing other wavelengths than the emission wavelength of the projection light L.

Figure 3:
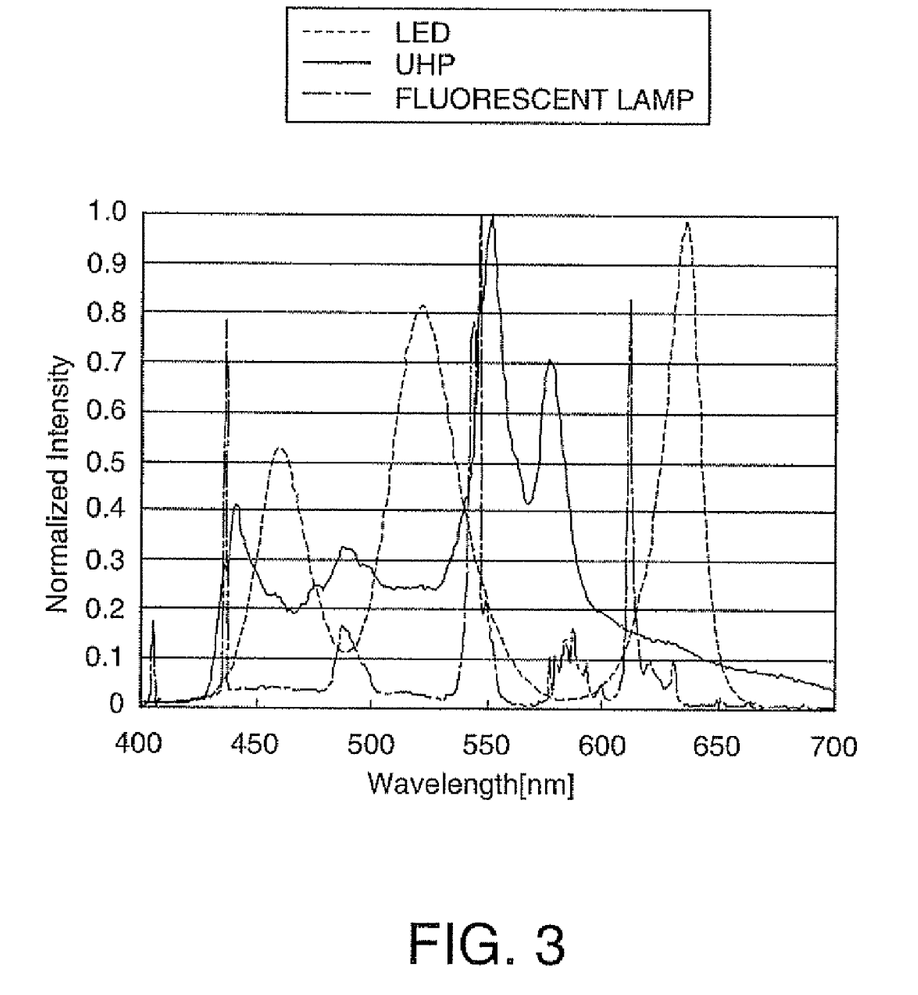
FIG. 3 is an explanatory diagram showing the spectrum of light entering the screen.

FIG. 3 is a diagram showing the emission spectrums of a typical ultra-high pressure (UHP) lamp (a ultra-high pressure mercury lamp), a fluorescent lamp, and a direct emission LED not using a fluorescent substance.

Among these devices, the emission principle of using the light emission caused when exciting mercury encapsulated in a light emission tube is common to the UHP lamp and the fluorescent lamp. Therefore, the emission peak of these devices corresponds to the bright line spectrum of mercury.

Specifically, mercury has the bright line spectrum of 404.7 nm, 435.8 nm, 546.1 nm, 577.0 nm, and 579.1 nm in the visible range. Among these wavelengths, the UHP lamp uses the peak wavelengths of 435.8 nm, 546.1 nm, 577.0 nm, and 579.1 nm.

Further, in the fluorescent lamp shown in the drawing, although some wavelength shift corresponding to the fluorescent substance used exists, there exist emission peaks at positions substantially overlapping the bright line spectrum of mercury. Further, the fluorescent lamp also has an emission peak at 488 nm, and also has a sharp emission peak derived from the fluorescent substance at 610 nm.

In other words, since the UHP lamp and the fluorescent lamp both have the emission peaks corresponding to the bright light of mercury, many of the respective peak wavelengths overlap with each other.

Therefore, it is understood that if the light source derived from mercury such as the UHP lamp is adopted as a light source of the projector PJ, the effectiveness of the improvement of the contrast by removing the outside light becomes limited in the room where the fluorescent lamp is used as the illumination light. This is because in the wavelength range where the emission peaks of the UHP lamp and the fluorescent lamp overlap with each other, it is not achievable to separate the light beams having the peak wavelengths overlapping with each other, and if the light derived from the fluorescent lamp is removed, the light derived from the UHP lamp is also removed at the same time.

In contrast, in the case of the solid-state light source such as an LED or an LD, the emission wavelength, namely the color of the emitted light can be controlled by changing the composition rate of the light emitting material. As representative examples of the light emitting material of an LED and the color of the light the light emitting material can emit, there can be cited AlGaAs (infrared rays through red), GaAsP (red through yellow), InGaN/GaN/AlGaN (green through violet), GaP (red through green), ZnSe (green through blue), and so on.

Therefore, in the room where the fluorescent lamp is used as the illumination light, it becomes possible to sharply discriminate the emission peaks of the outside light and the emission peaks of the projection light of the projector PJ from each other by using the solid-state light source not using the light derived from mercury, such as an LED or an LD. In the projector PJ for projecting images to the screen 1A according to the present embodiment, there are used LEDs for emitting light beams of 460 nm (blue), 520 nm (green), and 630 nm (red), respectively, as the light source.

In the case in which the projector PJ uses LEDs as the light source as in the example described above, the color materials 9x, 9y preferably have the absorption spectrum having the peak absorption wavelengths at positions not overlapping the peak wavelengths of the LEDs. By using such color materials 9x, 9y, it becomes possible for the first absorbing/scattering layer 4 and the second absorbing/scattering layer 5 to preferably transmit the projection light L, and at the same time absorb to thereby reduce the outside light OL.

As such color materials 9x, 9y as described above, any commercially available color materials known commonly can be used providing they are the color materials having the peak absorption wavelengths at positions not overlapping the bright line spectrum of the light source of the projector PJ, and therefore capable of mainly absorbing the outside light. In addition, since intensive projection light is to be applied thereto for a long period of time, the color material is preferably provided with high light resistance in order for continuously maintaining the performance for a long period of time.

As the color materials 9x, 9y described above, ADEKA ARKLS (products of ADEKA CORPORATION), for example, can be used in combination. Besides the materials described above, it is also possible to use metal complex azo dye, metal complex porphyrin dye, rhodamine dye, and so on.

Further, the material which can be used as the color material 9x is not limited to organic matter, but it is also possible to use an inorganic color material using coloring due to the surface plasmon resonance (SPR) of metallic nanoparticles (metallic fine particles).

The surface plasmon in the metallic nanoparticles denotes the state in which the free electrons in the metal forming the nanoparticle oscillate collectively, thus the collective electrons act as a pseudoparticle. When the metallic nanoparticles such as gold colloid are irradiated with the light in a region from visible light to near infrared light, the vibration of the surface plasmon and the vibration of the light resonate in harmony with each other, thereby absorbing a part of the light to provide colored light with the complementary color. The phenomenon described above is called the surface plasmon resonance.

Therefore, such metallic nanoparticles as those causing the surface plasmon resonance can be used as the color material 9x, and can be made to absorb the intended outside light. Further, if the metallic nanoparticles are used as the color material 9x, deterioration in the light resistance is not caused even by the long-term use, and it becomes possible to maintain the intended quality for a long period of time.

As the color material 9x described above, it is also possible to use fine particles of, for example, gold, silver, or copper, and further, it is also possible to use them in combination if necessary. By changing the particle size within a predetermined range (e.g., 10 nm through 50 nm), the peak absorption wavelengths of the color material 9x can arbitrarily be changed.

Figure 4A:
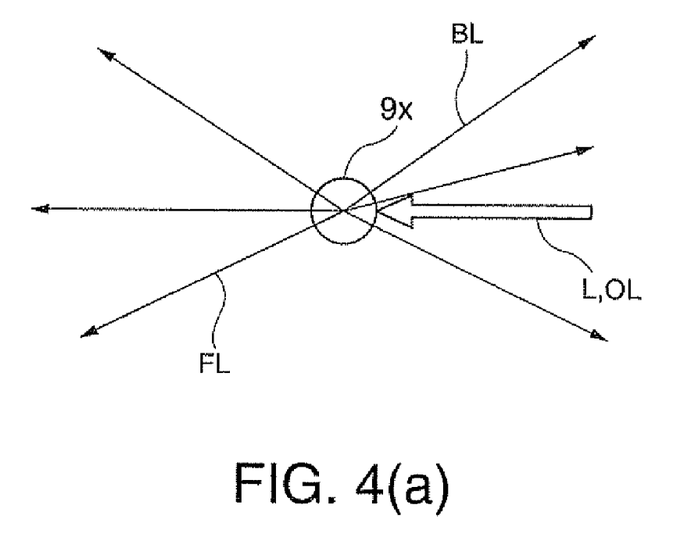
FIGS. 4A and 4B are explanatory diagrams for explaining color material used in the present embodiment.
Figure 4B:
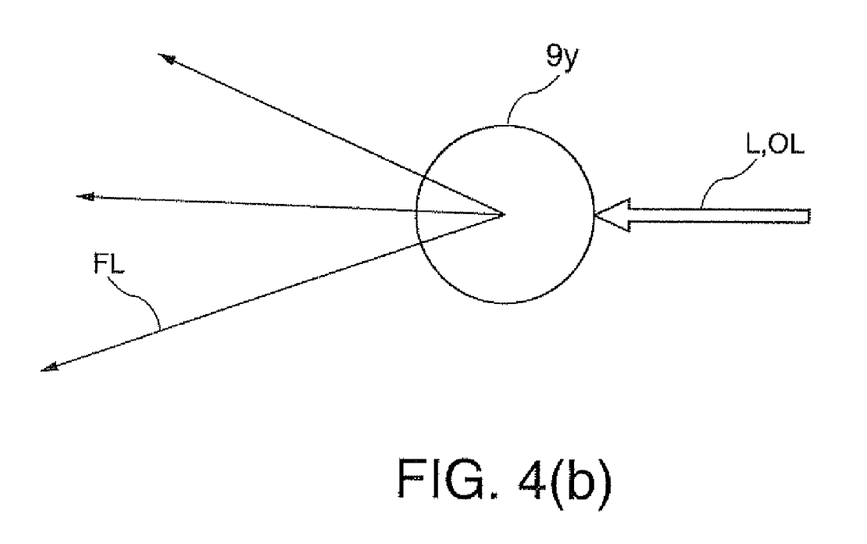

FIGS. 4A and 4B are schematic diagrams for explaining the behavior of the light applied to the color materials 9x, 9y. Here, as the light applied to the color materials 9x, 9y, the projection light L and the outside light OL can be cited.

Firstly, when the color material 9x is irradiated with the projection light L and the outside light OL, the color material 9x performs the Rayleigh scattering on these incident light beams, and therefore, scattered light is generated isotropically. In other words, the forward scattered light FL and the backscattered light BL are generated (see FIG. 4A).

In contrast, when the color material 9y is irradiated with the projection light L and the outside light OL, the color material 9y performs the Mie scattering on these incident light beams, and therefore, the forward scattered light FL is mainly generated (FIG. 4B). Although in the drawing one spherical particle is shown as the color material 9y, it is also possible to assume that the color material 9y is an aggregate (a secondary particle) composed of smaller particles (primary particles) agglutinated to have a size for causing the Mie scattering.

It is known that which one of the Rayleigh scattering and the Mie scattering is caused can be represented by a size parameter determined by the particle size (diameter) of the color material and the wavelength of the light. When denoting the size parameter as $\alpha$, the particle diameter of the color material as D, and the wavelength of the light as $\lambda$, the size parameter $\alpha$ can be expressed as $\alpha=\pi D/\lambda$. The Rayleigh scattering is caused in the condition of $\alpha<0.4$, the Mie scattering is caused in the condition of $0.4<\alpha<3$, and diffractive scattering is caused in the condition of $3<\alpha$.

These facts show that if the particle diameter of the color material is smaller than the wavelength of the visible light, the Rayleigh scattering is caused, and if the particle diameter of the color material is comparable to the wavelength of the visible light, the Mie scattering is caused. The color materials 9x, 9y of the present embodiment have the particle diameters satisfying the conditions defined by these size parameters.

The color materials 9x, 9y having such sizes as described above are formed by, for example, a method (a so-called top-down method) of mechanically grinding down the color material with a large particle diameter or the massive color material by friction to thereby achieve miniaturization. As such a method, there can preferably be used a method, called a wet process, of grinding down the color material with a large particle size of the massive color material by friction under co-existence of an abrading agent and an organic solvent.

Further, when isolating the combined or polymerized color material, it is also possible to add an appropriate aggregating agent to isolate it as an aggregate, thereby obtaining the color material having the size of the secondary particle. Alternatively, it is also possible to obtain the color material having the particle diameter derived from the reaction system by directly polymerizing the color material using a polymerization method such as emulsion polymerization, micro-suspension polymerization, or suspension polymerization (a so-called bottom-up method).

Further, it is also possible to use a method of precipitating the color material, which is combined or polymerized and then isolated, in a fine particle state by dissolving it with an organic solvent or sublimating it.

It is preferable that the color material thus formed excludes organic matter such as an emulsifying agent or a surface-active agent as foreign substances as much as possible. The reason therefor is that since the projection light with high intensity continues to be applied during use of the screen, if the color material with superfluous organic matter remaining is used, the organic matter (a foreign substance) is deteriorated by the projection light to be colored, thus needless quality degradation might be caused. From this point of view, the method of forming the color material using the top-down method by the wet process is preferable among the forming methods of the color material described above.

The first absorbing/scattering layer 4 and the second absorbing/scattering layer 5 include the color materials 9x, 9y described above.

Firstly, the second absorbing/scattering layer 5 has a function of absorbing the outside light OL, a deflection function of diffusing the projection light L to thereby broaden the horizontal view angle, and a reflection function of reflecting the projection light L toward the viewing side. In the second absorbing/scattering layer 5, a material having the color material 9x dispersed in colorless translucent binder resin can be used as a forming material, and the color material 9x is used as a scattering source for scattering the light and an absorbing component for absorbing the outside light OL. The reflection function of the second absorbing/scattering layer 5 will be described later.

The binder resin of the second absorbing/scattering layer 5 is arranged to have a refractive index different from that of the color material 9x. As the binder resin, translucent resin such as urethane resin or acrylic resin can preferably be used.

The first absorbing/scattering layer 4 has a function of absorbing the outside light OL, and a deflection function of diffusing the projection light L to thereby broaden the horizontal view angle. The first absorbing/scattering layer 4 is formed using a resin material (binder resin) having the color material 9y dispersed. The color material 9y is provided with the absorption band showing absorption peak at a position not overlapping the bright line spectrum of the light source of the projector PJ. Similarly to the color material 9x, the color material 9y is also used as the scattering source for scattering the light and the absorbing component for absorbing the outside light OL. Further, similarly to the case of the second absorbing/scattering layer 5, the binder resin of the first absorbing/scattering layer 4 is arranged to have a refractive index different from the color material 9y, and the translucent resin such as urethane resin or acrylic resin can preferably be used.

Since the first absorbing/scattering layer 4 and the second absorbing/scattering layer 5 are provided with the deflection function due to the characteristics of the color materials 9x, 9y, there is no need for providing a diffusion layer separately in order for broadening the horizontal view angle, and therefore, the number of processes can be reduced.

The number of types of the color material 9x can be one, or it is also possible to use two or more types of the color material 9x in combination, and the same is also applied to the color material 9y. By using two or more types of the color material 9x in combination, it becomes possible to preferably absorb the light with a plurality of wavelengths. The same is also applied to the color material 9y.

The antireflection layer 6 is composed of two types of transparent materials such as resin having flexibility and refractive indexes different from each other stacked alternately to form a multilayer structure. As the antireflection layer 6, a layer with a commonly known configuration can be used, and the plurality of layers constituting the antireflection layer 6 each has a refractive index adjusted so as to prevent reflection of the projection light L and the outside light OL on the surface of the first absorbing/scattering layer 4. The surface of the antireflection layer 6 forms the projection target surface 1a of the reflective screen 1A.

The functions of the screen 1A having the first absorbing/scattering layer 4 and the second absorbing/scattering layer 5 will be explained with reference to FIG. 2.

When an image is projected on the screen 1A using the projector PJ described above, the projection light L of the projector PJ reaches the first absorbing/scattering layer 4 via the antireflection layer 6. The color material 9y having the size causing the Mie scattering on the light in the visible light range is dispersed in the first absorbing/scattering layer 4, and the projection light L is applied to the color material 9y. Then, the projection light L is scattered forward (in the direction toward the deeper part of the screen), and reaches the second absorbing/scattering layer 5 while broadening the horizontal view angle.

The color material 9x having the size causing the Rayleigh scattering on the light in the visible light range is dispersed in the second absorbing/scattering layer 5, and the projection light L is applied to the color material 9x. Then, the projection light L is scattered forward and backward.

After having reached the reflecting layer 3 to be reflected, the forward scattered light in the second absorbing/scattering layer 5 passes through the second absorbing/scattering layer 5, the first absorbing/scattering layer 4, and the antireflection layer 6 sequentially in this order, and then reaches the observer V. Further, the backscattered light in the second absorbing/scattering layer 5 passes through the first absorbing/scattering layer 4 and the antireflection layer 6 sequentially in this order, and then reaches the observer V.

Here, since the absorption spectrums of the color materials 9x, 9y are arranged to absorb other wavelengths than the emission wavelengths of the projection light L, the projection light L is transmitted through the first absorbing/scattering layer 4 and the second absorbing/scattering layer 5 without being substantially absorbed by the color materials 9x, 9y.

In contrast, when the outside light OL reaches the first absorbing/scattering layer 4 via the antireflection layer 6, a part of the outside light OL is absorbed by the color material 9y contained in the first absorbing/scattering layer 4. Further, since the color material 9y causes the Mie scattering on the outside light OL not absorbed to thereby cause mainly the forward scattered light, the scattered light reflected toward the viewing side without being absorbed by the color material in the first absorbing/scattering layer 4 becomes extremely weak, thus the degradation in contrast can be prevented.

Further, the outside light OL passing through the first absorbing/scattering layer 4 and then having reached the second absorbing/scattering layer 5 is further absorbed by the color material 9x contained in the second absorbing/scattering layer 5. Further, the color material 9x causes the Rayleigh scattering on the outside light OL not absorbed, thereby isotropically generating the forward scattered light and the backscattered light. Among these scattered light beams, the forward scattered light is absorbed by the color material 9x when passing through the second absorbing/scattering layer 5 again after being reflected by the reflecting layer 3, and the backscattered light is absorbed by the color material 9y when passing through the first absorbing/scattering layer 4 again. Therefore, the influence of the outside light OL can preferably be reduced.

In addition, the outside light OL is repeatedly scattered inside the first absorbing/scattering layer 4 and the second absorbing/scattering layer 5 while being partially absorbed by the color materials 9x, 9y. Therefore, compared to the case in which the color materials 9x, 9y do not have the particle diameter for scattering the light, the outside light OL passes a longer distance through the first absorbing/scattering layer 4 and the second absorbing/scattering layer 5. An amount of absorption of the outside light OL by the color material is expressed by a function of the number of times of irradiation of the color material with the outside light OL and the rate of absorption of the outside light OL in the color material, and therefore, increases in an exponential manner as the transmission distance in the first and second absorbing/scattering layers increases. Therefore, compared to the case in which the color materials 9x, 9y do not scatter the light, the amount of absorption of the outside light OL increases, and it becomes possible to preferably prevent the degradation in contrast.

Therefore, according to the screen 1A having the configuration described above, it becomes possible to preferably increase the contrast of projection images to thereby achieve high-quality image display.

Further, in the projection system PS using the screen 1A, since uniform and bright projection images can be obtained even if the low power projector PJ is used in a bright room, it is possible to realize the projection system PS with low power consumption while keeping the image quality.

It should be noted that although in the present embodiment the color materials 9x, 9y are arranged to be formed using the same material, it is also possible to use different materials. In that occasion, it is preferable that the types and the composition of the color materials used as the color materials 9x, 9y are adjusted so that the color materials 9x, 9y can realize the intended outside light absorption in cooperation with each other even if the color materials used as the color materials 9x, 9y respectively absorb light beams with wavelengths different from each other.

Further, although in the present embodiment the configuration of having the second absorbing/scattering layer 5 is adopted, the configuration in which the second absorbing/scattering layer 5 is not used can also be adopted. Even in such a configuration, the color material 9y in the first absorbing/scattering layer 4 absorbs the outside light OL, and transmits the projection light L while scattering it forward. Since the projection light L thus transmitted is then reflected by the reflecting layer 3, and then reaches the observer V while being scattered again by the color material 9y, the reflective screen achieving the preferable increase in contrast can be obtained.

Second Embodiment

Figure 5:
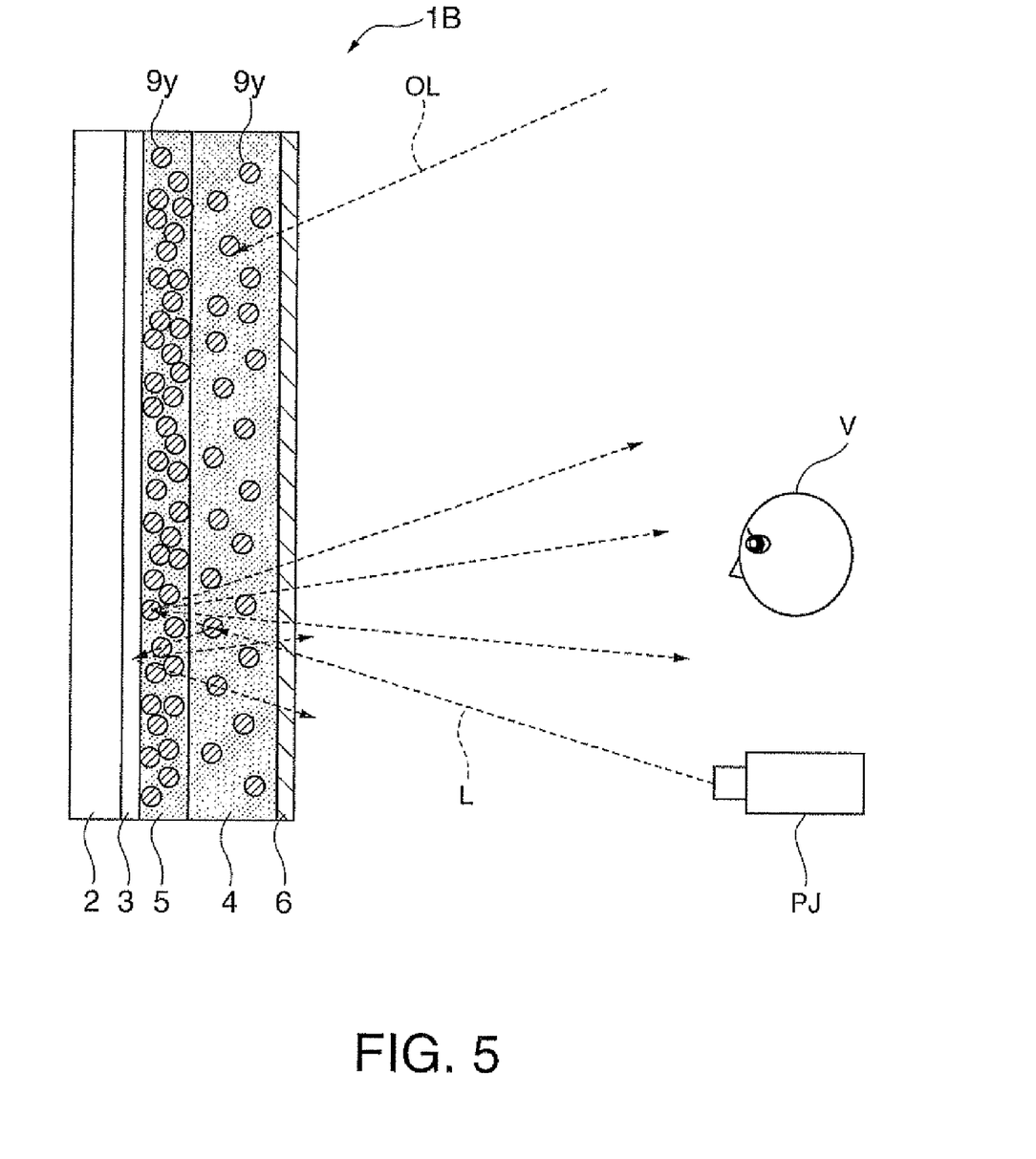
FIG. 5 is an explanatory diagram of a screen according to a second embodiment of the invention.

FIG. 5 is an explanatory diagram of a screen 1B according to a second embodiment of the invention. The screen 1B according to the present embodiment and the screen 1A according to the first embodiment have a part in common. These screens are different in that the color material dispersed in the second absorbing/scattering layer 5 is the same as the color material 9y dispersed in the first absorbing/scattering layer 4, and the first absorbing/scattering layer 4 and the second absorbing/scattering layer 5 are different in the density of the color material 9y. Therefore, the constituents common to the present embodiment and the first embodiment are denoted by the same reference symbols, and the detailed explanation therefor will be omitted.

As shown in the drawing, the color material 9y having the size for causing the Mie scattering on the light in the visible light range is dispersed in the second absorbing/scattering layer 5 according to the present embodiment. Further, in comparison between the first absorbing/scattering layer 4 and the second absorbing/scattering layer 5, it is arranged that the dispersion density in the second absorbing/scattering layer 5 is higher than that in the first absorbing/scattering layer 4 to the extent that the color material 9y causes the multiple scattering on the light in the visible light range.

Since in such a second absorbing/scattering layer 5 the scattered light toward the viewing side increases as a result of the multiple scattering, the effect substantially the same as in the case of generating the backscattering can be obtained even by using the color material 9y having the particle diameter for causing the Mie scattering.

Therefore, in the screen 1B having the configuration described above, the dispersion density of the color material in each layer is controlled in the two absorbing/scattering layers containing the same color material 9y, thereby making it possible to realize a desired scattering characteristic to preferably improve the contrast of projection images, thus achieving the high-quality image display.

Although the explanation is hereinabove presented regarding the preferable embodiments of the invention with reference to the accompanying drawings, it is obvious that the invention is not limited to the embodiments described above. The various shapes and combinations of the constituents presented in the embodiments are provided for exemplification only, and can be modified in various ways within the spirit or scope of the invention in accordance with design needs and so on.

Although in the embodiments described above the explanation is presented showing the reflective screen as the screen, the invention can also be applied to transmissive screens. On this occasion, by performing necessary changes in the specification, for example, using the translucent substrate while eliminating the reflecting layer, the transmissive screen using the color material as the scattering source can be obtained.

The entire disclosure of Japanese Patent Application Nos. 2009-158695, filed Jul. 3, 2009 and 2010-109272, filed May 11, 2010 are expressly incorporated by reference herein.

What is claimed is:

1. A screen comprising:
a substrate; and
a first color material layer disposed on one surface of the substrate,
wherein the first color material layer includes a first color material adapted to absorb light with a part of wavelengths of an incident light, and
the first color material has a peak absorption wavelength in a visible light range, and a size of causing Mie scattering on the light in the visible light range.

2. The screen according to claim 1, wherein
a binder resin of the first color material layer has a refractive index different from a refractive index of the first color material.

3. The screen according to claim 1, further comprising:
a reflecting layer disposed between the substrate and the first color material layer, and adapted to reflect the incident light.

4. The screen according to claim 1, further comprising:
a second color material layer including a second color material, disposed on a side opposite to a viewing side with respect to the first color material layer, and adapted to absorb light with a part of wavelengths of the incident light,
wherein the second color material has a peak absorption wavelength in the visible light range, and a size of causing Rayleigh scattering on the light having a wavelength in the visible light range.

5. The screen according to claim 4, wherein
a binder resin of the second color material layer has a refractive index different from a refractive index of the second color material.

6. The screen according to claim 4, wherein
the second color material includes a plurality of metal fine particles adapted to cause a surface plasmon resonance.

7. The screen according to claim 4, further comprising:
a reflecting layer disposed between the substrate and the second color material layer, and adapted to reflect the incident light.

8. A projection system comprising:
the screen according to claim 1; and
a projector adapted to project an image on the screen.

9. A screen comprising:
a substrate;
a first color material layer disposed on one surface of the substrate; and a second color material layer disposed between the substrate and the first color material layer, wherein the first color material layer and the second color material layer include a color material adapted to absorb light with a part of wavelengths of the incident light, the color material has a peak absorption wavelength in a visible light range, and a size of causing Mie scattering on the light having a wavelength in the visible light range, and a density of the color material in the second color material layer is higher than a density of the color material in the first color material layer.

10. The screen according to claim 9, wherein a binder resin of the first color material layer and a binder resin of the second color material layer each have a refractive index different from a refractive index of the color material.

* * * * *